United States Patent
Chin et al.

(10) Patent No.: US 8,996,041 B2
(45) Date of Patent: Mar. 31, 2015

(54) METHOD AND APPARATUS FOR THE MULTIMODE TERMINAL TO MONITOR PAGING MESSAGES IN CDMA EVDO AND FRAME SYNCHRONOUS TD-SCDMA NETWORKS

(75) Inventors: Tom Chin, San Diego, CA (US); Guangming Shi, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 13/384,179

(22) PCT Filed: Mar. 26, 2010

(86) PCT No.: PCT/US2010/028953
§ 371 (c)(1),
(2), (4) Date: Jan. 13, 2012

(87) PCT Pub. No.: WO2011/056250
PCT Pub. Date: May 12, 2011

(65) Prior Publication Data
US 2012/0264483 A1    Oct. 18, 2012

Related U.S. Application Data

(60) Provisional application No. 61/258,507, filed on Nov. 5, 2009.

(51) Int. Cl.
*H04W 68/00* (2009.01)
*H04M 1/00* (2006.01)
*H04W 88/06* (2009.01)

(52) U.S. Cl.
CPC .............. *H04W 68/00* (2013.01); *H04W 88/06* (2013.01)
USPC ........................................ 455/458; 455/552.1

(58) Field of Classification Search
CPC .............................. H04W 68/00; H04W 88/06
USPC .............................................. 455/458, 552.1
See application file for complete search history.

(56) References Cited

U.S. PATENT DOCUMENTS

| 7,020,477 B2 | 3/2006 | Cramby et al. |
| 7,366,124 B2 | 4/2008 | Lee et al. |

(Continued)

FOREIGN PATENT DOCUMENTS

| CN | 101090564 A | 12/2007 |
| CN | 101453778 A | 6/2009 |

(Continued)

OTHER PUBLICATIONS

International Search Report and Written Opinion—PCT/US2010/028953—ISA/EPO—Oct. 28, 2010.
Taiwan Search Report—TW099110189—TIPO—Dec. 13, 2013.

*Primary Examiner* — Opiribo Georgewill
(74) *Attorney, Agent, or Firm* — Kristine U. Ekwueme

(57) ABSTRACT

Certain aspects of the present disclosure propose techniques for avoiding paging interval conflicts in a multimode terminal (MMT) capable of communicating via at least two different radio access technologies (RATs). Certain aspects provide a method for communicating, by an MMT, with first and second networks via first and second RATs. The method generally includes determining a discontinuous reception (DRX) cycle length of the first network, determining a paging cycle length of the second network, determining—based on the paging cycle length and the DRX cycle length—information associated with a position of a paging interval within the paging cycle length of the second network that avoids overlap between a paging interval of the first network and the paging interval of the second network, and communicating the information to the second network. For some aspects, the information may comprise a set of control channel cycle (CCC) indices.

32 Claims, 9 Drawing Sheets

(56) References Cited

U.S. PATENT DOCUMENTS

2008/0120417 A1* 5/2008 Harikumar et al. ........... 709/227
2008/0287149 A1 11/2008 Womack et al.
2009/0215472 A1* 8/2009 Hsu .............................. 455/458

FOREIGN PATENT DOCUMENTS

| WO | WO03058992 A1 | 7/2003 |
| WO | 2008143563 A1 | 11/2008 |

* cited by examiner

600

| Slot Cycle | Slots | CC Cycles | Sleep Period (sec) |
|---|---|---|---|
| 0 | 4 | 0.015625 | 0.006667 |
| 1 | 8 | 0.03125 | 0.013333 |
| 2 | 16 | 0.0625 | 0.026667 |
| 3 | 32 | 0.125 | 0.053333 |
| 4 | 64 | 0.25 | 0.106667 |
| 5 | 128 | 0.5 | 0.213333 |
| 6 | 256 | 1 | 0.42667 |
| 7 | 768 | 3 | 1.28 |
| 8 | 1536 | 6 | 2.56 |
| 9 | 3072 | 12 | 5.12 |
| 10 | 6144 | 24 | 10.24 |
| 11 | 12288 | 48 | 20.48 |
| 12 | 24576 | 96 | 40.96 |
| 13 | 49152 | 192 | 81.92 |
| 14 | 98304 | 384 | 163.84 |
| 15 | 196608 | 768 | 327.68 |

FIG. 6

METHOD AND APPARATUS FOR THE MULTIMODE TERMINAL TO MONITOR PAGING MESSAGES IN CDMA EVDO AND FRAME SYNCHRONOUS TD-SCDMA NETWORKS

CROSS-REFERENCE TO RELATED APPLICATION(S)

This application claims the benefit of U.S. Provisional Patent Application No. 61/258,507, entitled "METHOD AND APPARATUS FOR THE MULTIMODE TERMINAL TO MONITOR PAGING MESSAGES IN CDMA EVDO AND FRAME SYNCHRONOUS TD-SCDMA NETWORKS," filed on Nov. 5, 2009, which is expressly incorporated by reference herein in its entirety.

BACKGROUND

1. Field

Certain aspects of the present disclosure generally relate to wireless communications and, more particularly, to scheduling paging intervals in a multimode terminal (MMT) capable of communicating via at least two different radio access technologies (RATs) in an effort to avoid paging interval conflicts.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division—Code Division Multiple Access (TD-CDMA), and Time Division—Synchronous Code Division Multiple Access (TD-SCDMA). For example, China is pursuing TD-SCDMA as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies not only to meet the growing demand for mobile broadband access, but also to advance and enhance the user experience with mobile communications.

SUMMARY

In an aspect of the disclosure, a method for communicating, by a multimode terminal (MMT), with first and second networks via first and second radio access technologies (RATs) is provided. The method generally includes determining a discontinuous reception (DRX) cycle length of the first network, determining a paging cycle length of the second network, determining—based on the paging cycle length and the DRX cycle length—information associated with a position of a paging interval within the paging cycle length of the second network that avoids overlap between a paging interval of the first network and the paging interval of the second network, and communicating the information to the second network. For some aspects, the information comprises a set of control channel cycle (CCC) indices.

In an aspect of the disclosure, an apparatus for communicating with first and second networks via first and second RATs is provided. The apparatus generally includes means for determining a DRX cycle length of the first network, means for determining a paging cycle length of the second network, means for determining—based on the paging cycle length and the DRX cycle length—information associated with a position of a paging interval within the paging cycle length of the second network that avoids overlap between a paging interval of the first network and the paging interval of the second network, and means for communicating the information to the second network.

In an aspect of the disclosure, an apparatus for communicating with first and second networks via first and second RATs is provided. The apparatus generally includes at least one processor and a memory coupled to the at least one processor. The at least one processor is typically configured to determine a DRX cycle length of the first network, to determine a paging cycle length of the second network, to determine—based on the paging cycle length and the DRX cycle length—information associated with a position of a paging interval within the paging cycle length of the second network that avoids overlap between a paging interval of the first network and the paging interval of the second network, and to communicate the information to the second network.

In an aspect of the disclosure, a computer-program product for communicating with first and second networks via first and second RATs is provided. The computer-program product generally includes a computer-readable medium having code for determining a DRX cycle length of the first network, determining a paging cycle length of the second network, determining—based on the paging cycle length and the DRX cycle length—information associated with a position of a paging interval within the paging cycle length of the second network that avoids overlap between a paging interval of the first network and the paging interval of the second network, and communicating the information to the second network.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

FIG. 6 illustrates various CDMA EVDO Rev A sleep period values, in accordance with certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
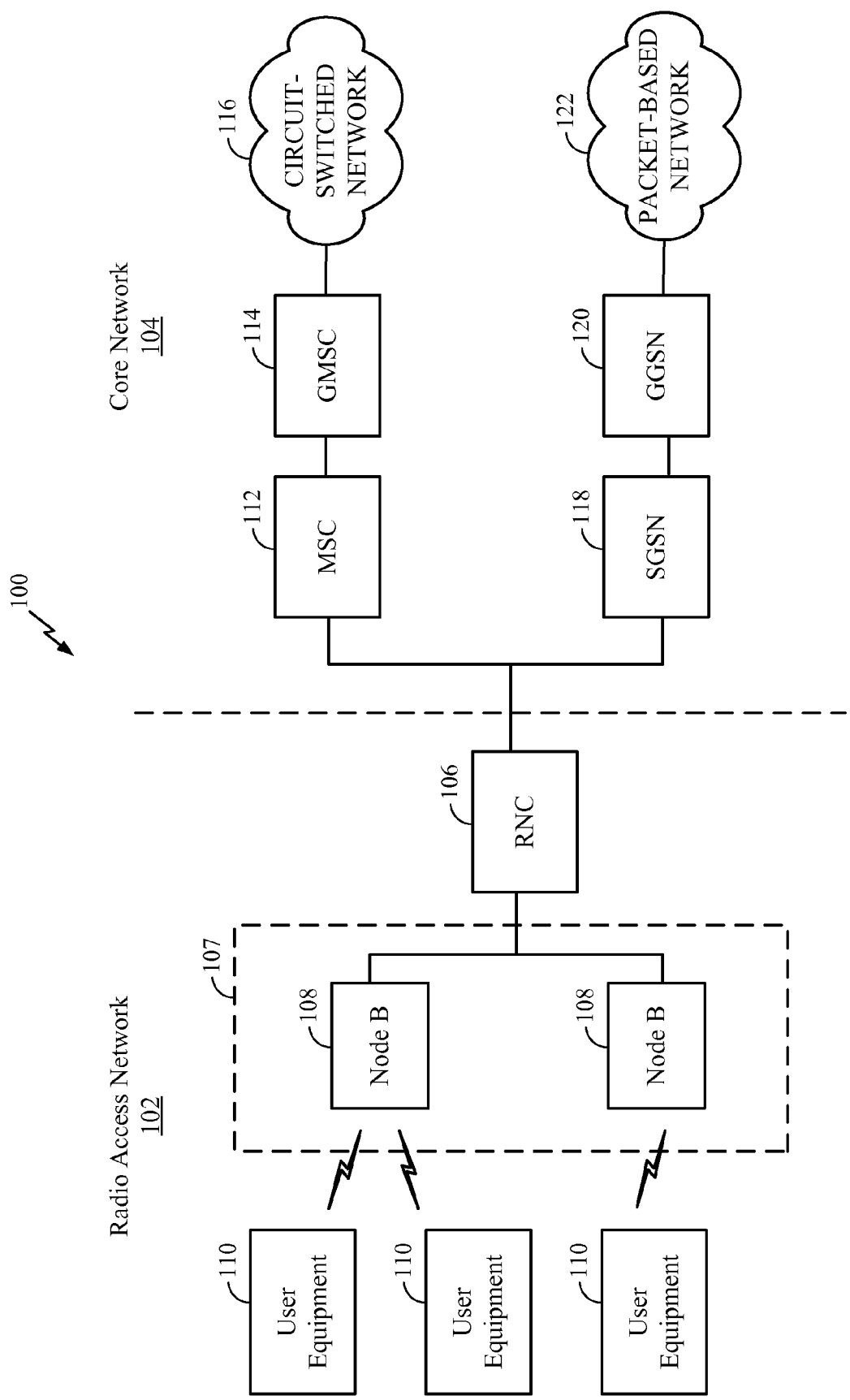
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
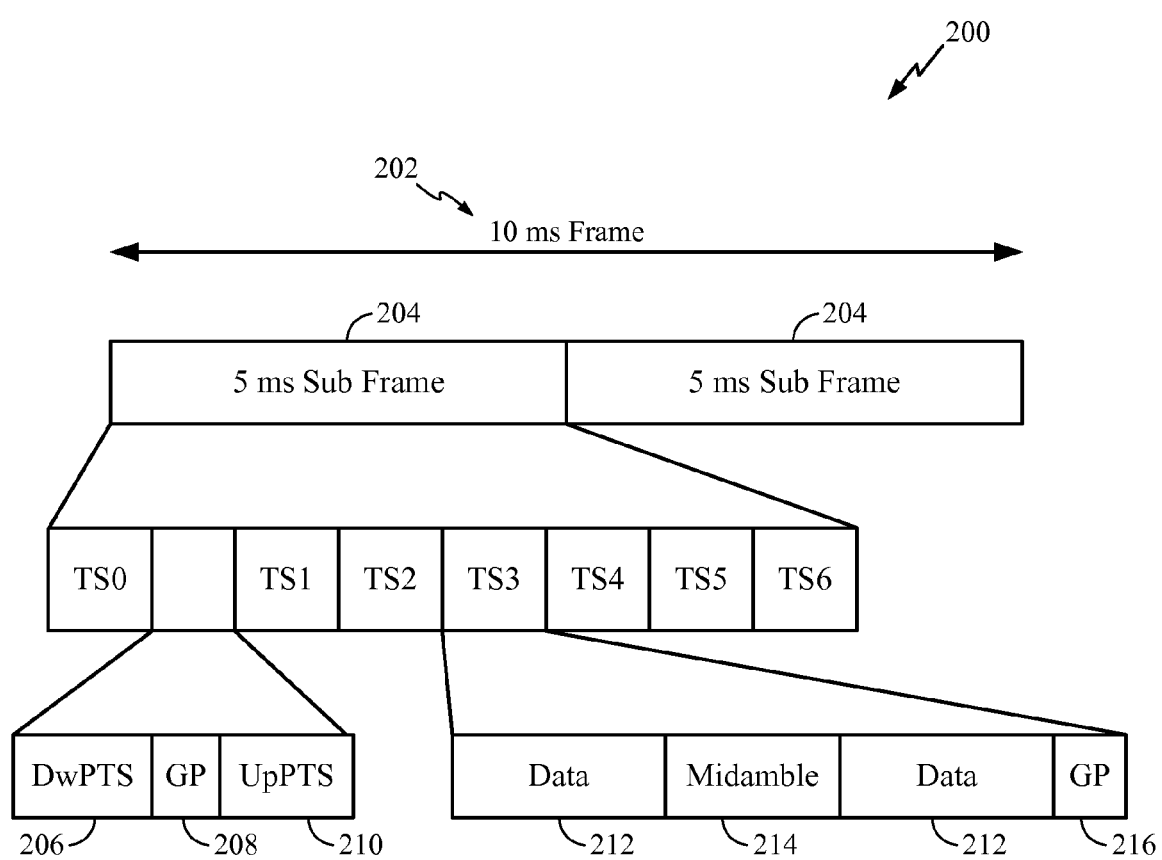
FIG. 2 is a block diagram conceptually illustrating an example of a frame structure in a telecommunications system in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
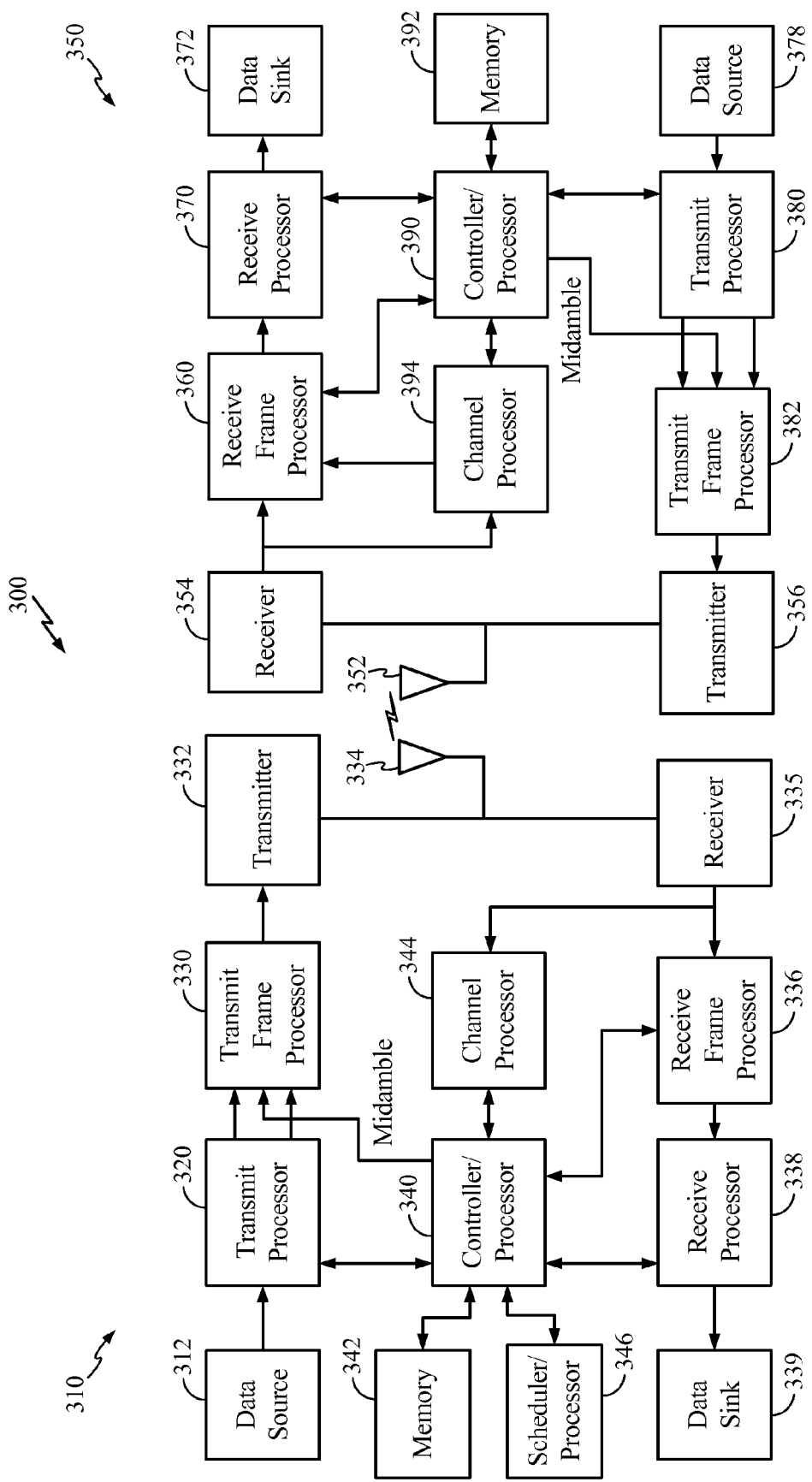
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

An Example Method for the Multimode Terminal to Monitor Paging Messages in CDMA EVDO and Frame Synchronous TD-SCDMA Networks In order to expand the services available to subscribers, some MSs support communications with multiple radio access technologies (RATs). For example, a multimode terminal (MMT) may support TD-SCDMA and CDMA EVDO (Evolution-Data Optimized) for voice and broadband data services.

As a result of supporting multiple RATs, there may be instances in which an MMT may be in an idle mode in both the TD-SCDMA and the CDMA EVDO networks. This may require the MMT to listen for traffic indication or paging messages in both networks. Unfortunately, an MMT with a single RF chain may only listen to one network at a time.

In deployment of the TD-SCDMA service, the TD-SCDMA network can become a radio access network overlaid with other technologies, such as CDMA EVDO. A multimode terminal (supporting, e.g., TD-SCDMA and EVDO) may register with both networks to provide services. In such a CDMA EVDO and TD-SCDMA overlaid network, the multimode terminal may become idle in both systems when there is no traffic connection at all.

Figure 4:
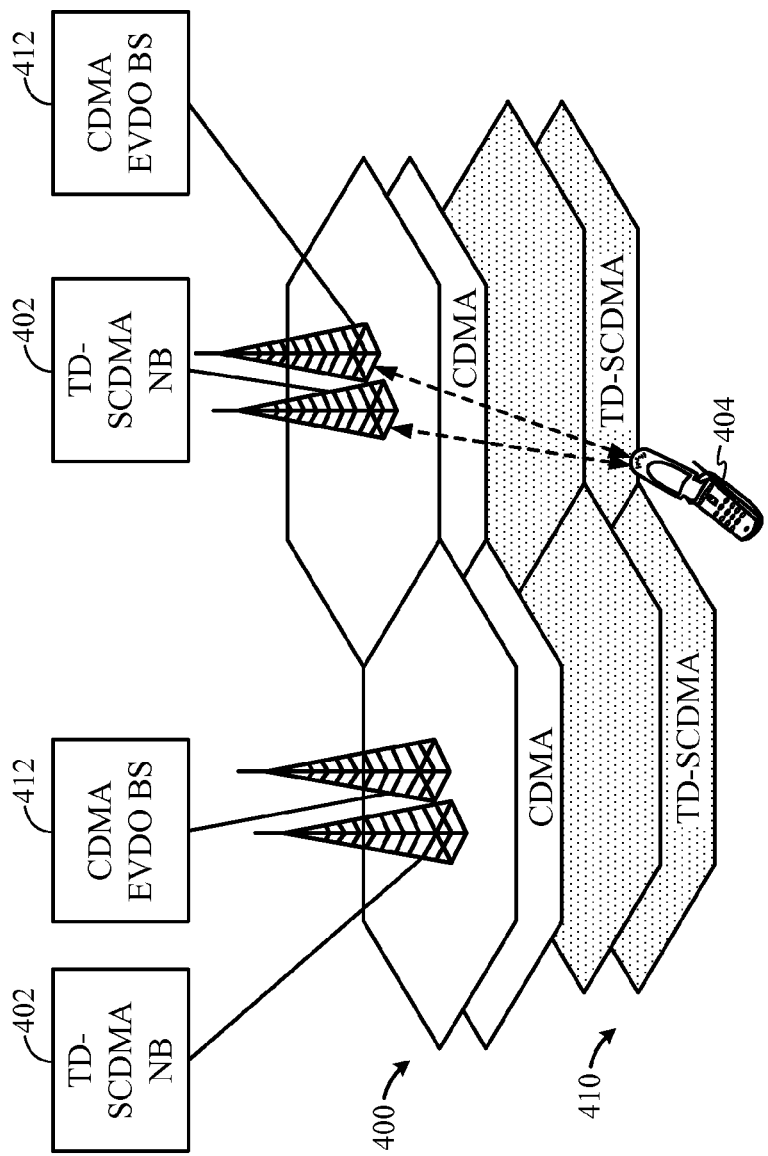
FIG. 4 illustrates an example Code Division Multiple Access (CDMA) EVDO (Evolution-Data Optimized) network overlaying an example Time Division Synchronous Code Division Multiple Access (TD-SCDMA) network in accordance with certain aspects of the present disclosure.

FIG. 4 illustrates an example CDMA EVDO network 400 overlaying an example TD-SCDMA network 410. An MMT 404 may communicate with either or both networks 400, 410 via TD-SCDMA node Bs (NBs) 402 and/or CDMA EVDO base stations (BSs) 412.

For example, one example use case may be that the MMT can register with the CDMA EVDO network 400 for data service and with the TD-SCDMA network 410 for voice call service. Another use case may occur because the MMT has two SIMs: one for CDMA EVDO and another for TD-SCDMA.

The MMT—called user equipment (UE) in TD-SCDMA or a mobile station (MS) in CDMA EVDO—may monitor the paging messages in both networks to receive a mobile-terminated call. However, this may require the MMT 404 to periodically switch between the EVDO network and the TD-SCDMA network to check for paging message in both networks.

If the MMT can only listen to one network at a time, when paging intervals for two networks such as TD-SCDMA and CDMA EVDO overlap, this becomes a paging interval conflict, and the MMT can only choose one network from which to listen to the paging messages. This can be due to having only a single RF chain or to limited processing power of the terminal. This is also called the hybrid configuration.

In CDMA EVDO, the MS in a slotted idle state will listen to a certain Control Channel Cycle (CCC). Each CCC has 256 slots or 426.67 ms (each slot lasts for 5/3 ms).

Figure 5:
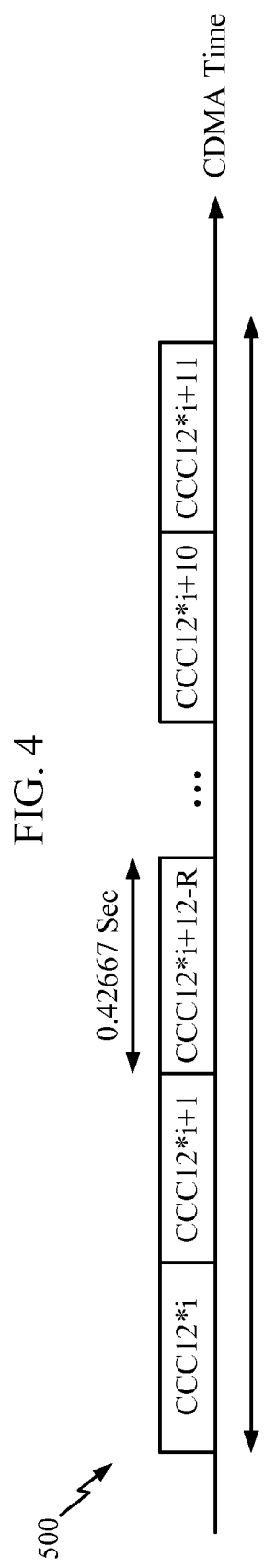
FIG. 5 illustrates an example CDMA EVDO Rev 0 wake up time schedule in accordance with certain aspects of the present disclosure.

In EVDO Rev 0, the idle state protocol may allow the MS to wake up for one CCC per 5.12 seconds where 12 CCCs are available per 5.12 seconds. FIG. 5 illustrates an example CDMA EVDO Rev 0 wake up time schedule 500. Each CCC has an index starting from the beginning of the CDMA System Time. The MS shall wake up on a CCC with index C satisfying:

$$(C+R) \bmod 12 = 0$$

The above parameter R may be set by either of the following options:

1. A random generation algorithm specified in the CDMA standards, or
2. Some MS-preferred value, called PreferredControlChannelCycle.

The MS may choose the above option 1 or 2 by setting a PreferredControlChannelCycleEnabled parameter to '0' or '1,' respectively. If the MS decides to set the PreferredControlChannelCycle, the MS may use Generic Configuration Protocol to set this value by transmitting an EVDO Configuration Request message.

In EVDO Rev A, however, the enhanced idle state protocol may allow the MS 404 to wake up for a few possible sleep periods between 4 slots (or SlotCycle0) and 196608 slots (or SlotCycle15). The table 600 illustrated in FIG. 6 shows various CDMA EVDO Rev A sleep period values. To conserve battery power, however, aspects of the present disclosure may only consider sleep periods greater than one CCC (i.e., the Slot Cycle is 7 or above in the table 600).

EVDO Rev A protocols also allow the MS to sleep with multiple stages of sleep periods: Period1, Period2, and Period3, subsequently. However, the final sleep period (i.e., Period3) will represent the final sleep period, and thus, Period3 is of interest according to aspects of the present disclosure.

EVDO Rev A specifies that the MS shall wake up at the slot:

$$[T+256*R] \bmod \text{Period} = \text{Offset}$$

This is in fact equivalent to CCC index C satisfying:

$$(C+R) \bmod P = 0, \text{ where } P = \text{Period3}/256$$

The above Period3 may be set properly as Rev A, either by a random generation formula or the PreferredControlChannelCycle. During the MS-specific wakeup time period, the MS may receive a paging message intended for it.

Figure 7:
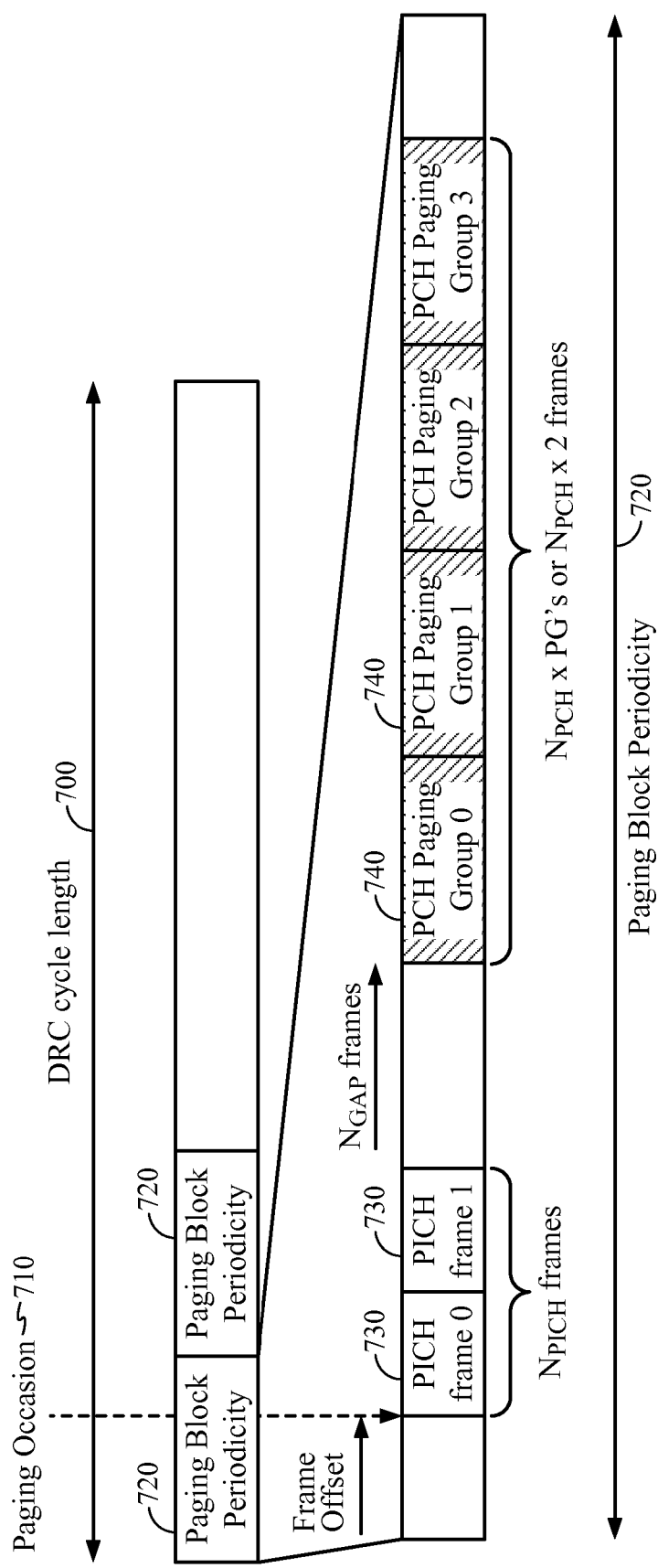
FIG. 7 illustrates an example Discontinuous Reception (DRX) cycle for TD-SCDMA with the Paging Block Periodicity (PBP) and the structure of a TD-SCDMA Paging Interval Channel (PICH) and a Paging Channel (PCH), in accordance with certain aspects of the present disclosure.

FIG. 7 illustrates a Discontinuous Reception (DRX) cycle 700 for TD-SCDMA with the Paging Block Periodicity (PBP) 720 and the structure of a TD-SCDMA Paging Indicator Channel (PICH) 730 and a Paging Channel (PCH) 740. In TD-SCDMA, the UE in idle mode DRX operation may listen to certain recurrent paging blocks with PICH 730, followed by PCH 740. The DRX cycle 700 may be determined by circuit-switched (CS) CN (Core Network) in the System Information message. As an alternative, the DRX cycle 700 may be negotiated between the UE and the packet-switched (PS) CN. The final DRX cycle length may be the minimum between CS CN and PS CN.

The UE may then listen to the PICH 730 starting with the associated paging occasion 710, given by the following formula:

paging_occasion=(IMSI div $K$)mod(DRX_cycle_length div PBP)*PBP+frame_offset+$i$*DRX_cycle_length where the PBP (Paging Block Periodicity) is the number of frames (each of 10 ms) between two paging blocks and frame offset is the frame offset of the first frame in the PBP, provided by the System Information message. IMSI is the International Mobile System Identity, and K is the number of S-CCPCHs (Secondary Common Control Physical Channels) that can carry PCH (Paging Channel).

Per Paging Block Periodicity, there is a PICH for $N_{PICH}$ frames and PCH for $N_{PCH}*2$ frames. There are $N_{GAP}$ frames from the end of the PICH to the beginning of the PCH. The UE is assigned to one of the $N_{PICH}$ frames in a PICH block and one of $N_{PCH}$ paging groups (each of 2 frames) in the PCH, which starts from the associated paging occasion 710. The parameters $N_{PICH}$, $N_{GAP}$, and $N_{PCH}$ may be known from System Information.

The UE may only listen to some specific frame of PICH according to the following formula:

$p$=[(IMSI div 8192)mod($N_{PICH}*N_{PI}$)] div $N_{PI}$ where $N_{PI}$ is the number of paging indicators per frame in the PICH and can be derived from the System Information. Moreover, the UE may only listen to one specific paging group on PCH using the following formula:

$q$=((IMSI div 8192)mod($N_{PICH}*N_{PI}$))mod $N_{PCH}$

Therefore, from one UE perspective, the paging monitoring interval may most likely be:

for $N$ frames, where $N=(N_{PICH}-p)+N_{GAP}+(q+1)*2$ frames (1a)

from paging_occasion+$p$ frames (1b)

From the timing perspective, the CDMA EVDO base station (BS) is synchronous. The TD-SCDMA frame boundary is synchronous, and the system frame number (SFN) is assumed to be synchronous for different NBs, as well. However, when the multimode terminal registers to both a CDMA EVDO network and a TD-SCDMA network for listening to paging messages, there may be some time when the CDMA EVDO paging monitoring interval and the TD-SCDMA paging monitoring interval conflict.

Accordingly, what is needed are techniques and apparatus for avoiding paging interval conflicts between the CDMA EVDO and the TD-SCDMA networks. Certain aspects of the present disclosure provide methods for an MMT, such as a TD-SCDMA multimode UE, in idle mode to monitor paging messages from two networks using different RATs without paging interval conflicts.

Figure 8:
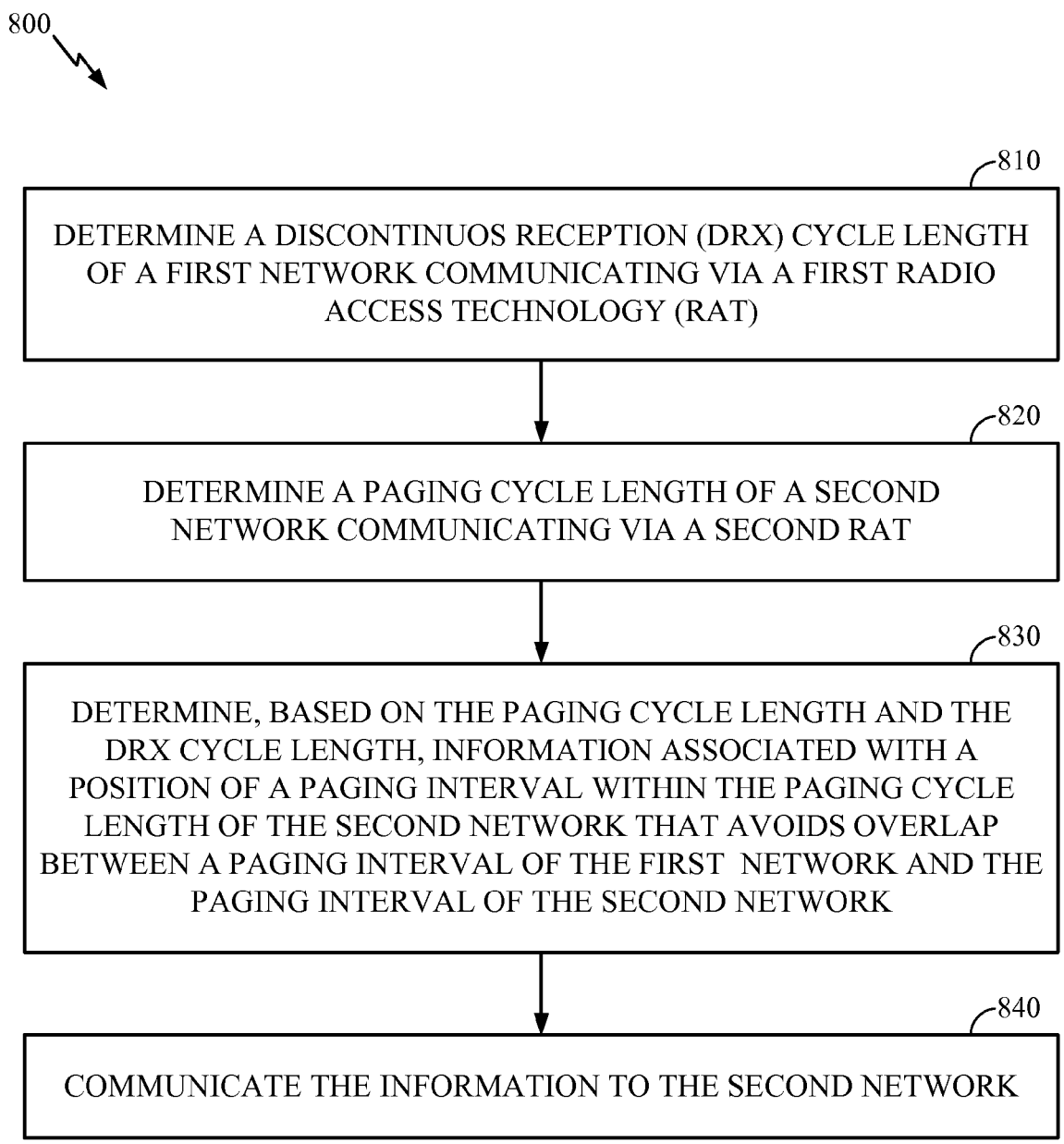
FIG. 8 is a functional block diagram conceptually illustrating example blocks executed to schedule paging intervals for a multimode terminal (MMT) in an effort to avoid paging interval conflicts between paging intervals of two networks communicating via two different radio access technologies (RATs), in accordance with certain aspects of the present disclosure.

FIG. 8 is a functional block diagram conceptually illustrating example blocks 800 executed to schedule paging intervals for an MMT in an effort to avoid, or at least reduce, paging interval conflicts between paging intervals of two networks communicating via two different RATs. Operations illustrated by the blocks 800 may be executed, for example, at the processor(s) 370 and/or 390 of the UE 350 from FIG. 3. The operations may begin at block 810 by determining a DRX cycle length of a first network communicating via a first RAT, such as TD-SCDMA. The MMT may determine a paging cycle length of a second network communicating via a second RAT, such as CDMA EVDO, at block 820. At block 830, the MMT may determine, based on the paging cycle length and the DRX cycle length, information associated with a position of a paging interval within the paging cycle length of the second network that avoids overlap (e.g., a paging interval conflict) between a paging interval of the first network and the paging interval of the second network. The MMT may communicate the information to the second network at block 840. For some aspects, the information may comprise a set of CCC indices, and the MMT may communicate one or more of the CCC indices to the second network.

Assuming the TD-SCDMA network is SFN synchronous, the EVDO paging monitoring CCC interval may be scheduled to completely avoid paging interval conflicts. Some aspects of the disclosure propose the following procedures described in A) to E) below to accomplish this.

A) Paging Cycle Determination

Aspects of the present disclosure propose that the TD-SCDMA DRX cycle length for the MMT 404 may be a multiple of 1.28 seconds, denoted by m*1.28 seconds. These aspects also may assume that the MMT operating in CDMA EVDO has a paging cycle length=n*1.28 seconds, where n=1, 2, 4, . . . . In particular, EVDO Rev 0:$n$=4 (2a)

EVDO Rev A:$n$=Period3/(256*3) (2b)

The greatest common denominator between the factors m and n may be computed:

$k$=g.c.d{$m,n$} (3)

The above variable k is generally defined herein to be the greatest multiple of 1.28 seconds that can divide both the CDMA EVDO paging cycle length and the TD-SCDMA DRX cycle length.

B) Cross-Referencing of EVDO and TD-SCDMA Paging Intervals

Figure 9:
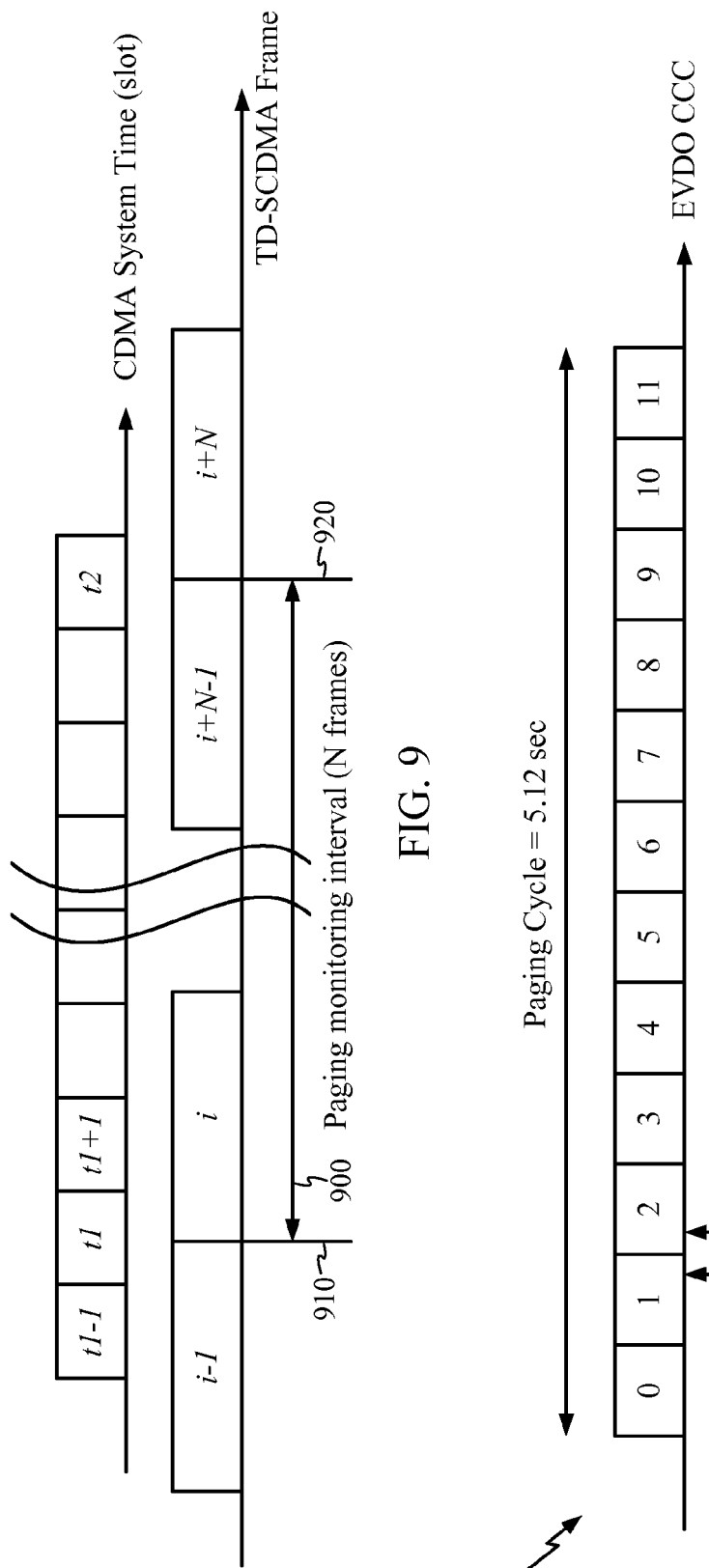
FIG. 9 illustrates an example relationship between CDMA EVDO slots and a TD-SCDMA paging interval, in accordance with certain aspects of the present disclosure.

After synchronizing to the CDMA EVDO and TD-SCDMA systems, the MMT 404 may know that for a CDMA EVDO system time having units of slots, a particular reference TD-SCDMA paging interval 900 may start at 910 and end at 920, as shown in FIG. 9. In units of slots, this reference TD-SCDMA paging interval 900 may start and end at t1 and t2. The TD-SCDMA paging interval 900 is defined by equations (1a) and (1b).

C) Determination of CCC(s) to Cover Paging Listening Interval

From the above results, the terminal may decide the CCC(s) that can cover the TD-SCDMA paging interval according to the following equations:

CCC_start=FLOOR[($t$1−$T$_tune)/256] (4a)

CCC_end=CEILING[($t$2+$T$_tune)/256] (4b)

CCC_start may generally be defined herein as the CCC index T_tune time before the reference TD-SCDMA paging monitoring interval starts. T_tune may generally be defined herein as the delay for tuning the RF receiver circuit, acquiring the system, and being ready to decode paging information. CCC_end may generally be defined herein as the CCC index T_tune time after the reference TD-SCDMA paging monitoring interval ends.

The MMT 404 may then determine the following variables:

$k$_start=$C$_start mod(3*$k$) (5a)

$k$_end=$C$_end mod(3*$k$) (5b)

where k is given by the above equation (3). Multiplication by 3 is performed because 1.28 seconds have 3 CCCs.

D) EVDO PreferredControlChannelCycle

A basic possible set of CCC indices to avoid conflicts with TD-SCDMA paging monitoring interval may be written as:

$$A0 = \{u; u=0,1,\ldots,3*k-1, \text{ but } u \neq k\_start, k\_end\} \quad (6)$$

Therefore, the complete set may be written as:

$$A = \{u + v*3*k; u \text{ in } A0, v=0,1,\ldots,n/k-1\} \quad (7)$$

The MMT 404 may choose any CCC index in the set A as the PreferredControlChannelCycle value in an effort to avoid conflicts with the TD-SCDMA paging monitoring interval.

E) Communication to EVDO BS

Once the MMT 404 decides the PreferredControlChannelCycle, the MMT may transmit this information to the EVDO BS 412 using a Configuration Request Message, for example.

F) Dual Paging Monitoring

Once the PreferredControlChannelCycle has been communicated to the EVDO BS 412, the MMT 404 may sleep and wake up according to two separate paging monitoring intervals (e.g., TD-SCDMA and EVDO) to listen to the paging messages without conflicts.

Figure 10:
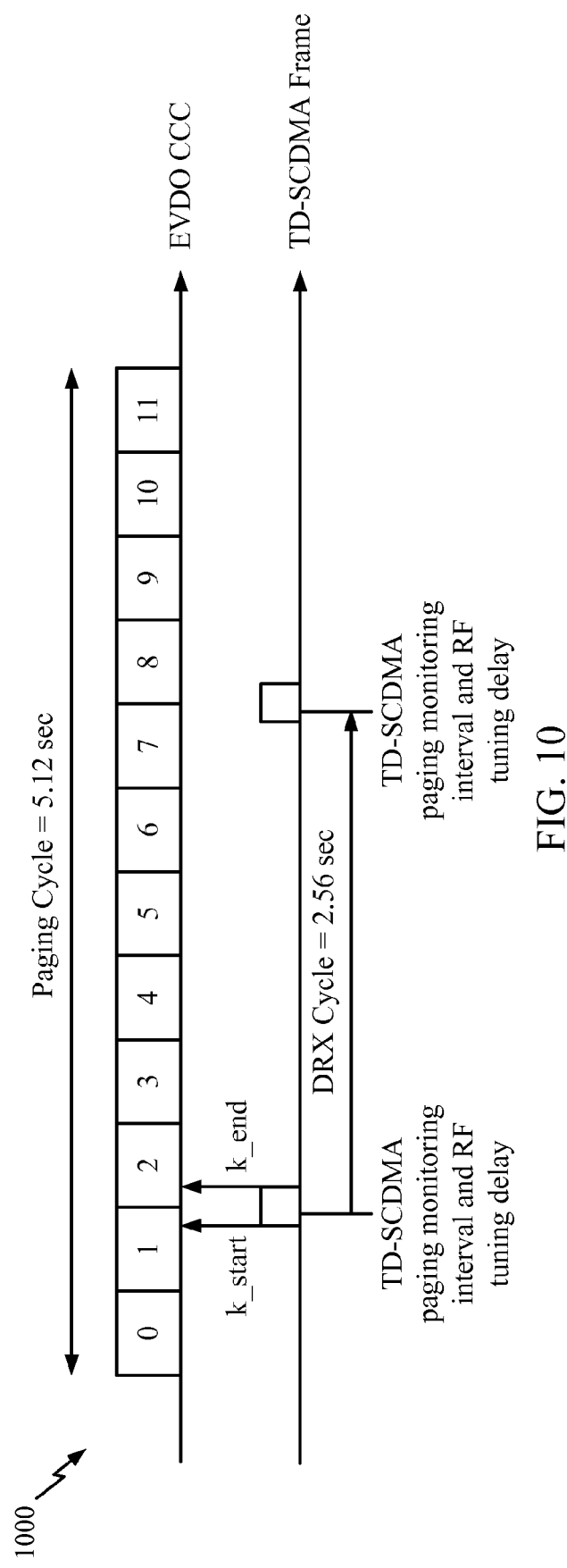
FIG. 10 illustrates an example relationship between CDMA EVDO Control Channel Cycles (CCCs) and a TD-SCDMA paging interval, in accordance with certain aspects of the present disclosure.

FIG. 10 illustrates an example relationship 1000 between CDMA EVDO Control Channel Cycles (CCCs) and a TD-SCDMA paging interval as calculated by steps A) to D) above.

Example Calculations in A) to D)

TD-SCDMA DRX cycle=2.56 sec=2*1.28 sec. $m=2$

EVDO paging cycle=5.12 sec=4*1.28 sec. $n=4$ $k$=g.c.d$\{2,4\}$=2      A):

$k\_start=1, k\_end=2$      C):

$$D): A0 = \{u; u = 0, 1, \ldots, 3*2 - 1, \text{ but } u \neq 1, 2\} = \{0, 3, 4, 5\}$$

$$A = \{u + v*3*2; u \text{ in } A0, v = 0, 1, \ldots, 4/2 - 1\}$$

$$= \{u + v*6; u = 0, 3, 4, 5, v = 0, 1\}$$

$$= \{0, 3, 4, 5, 6, 9, 10, 11\}$$

Figure 11:
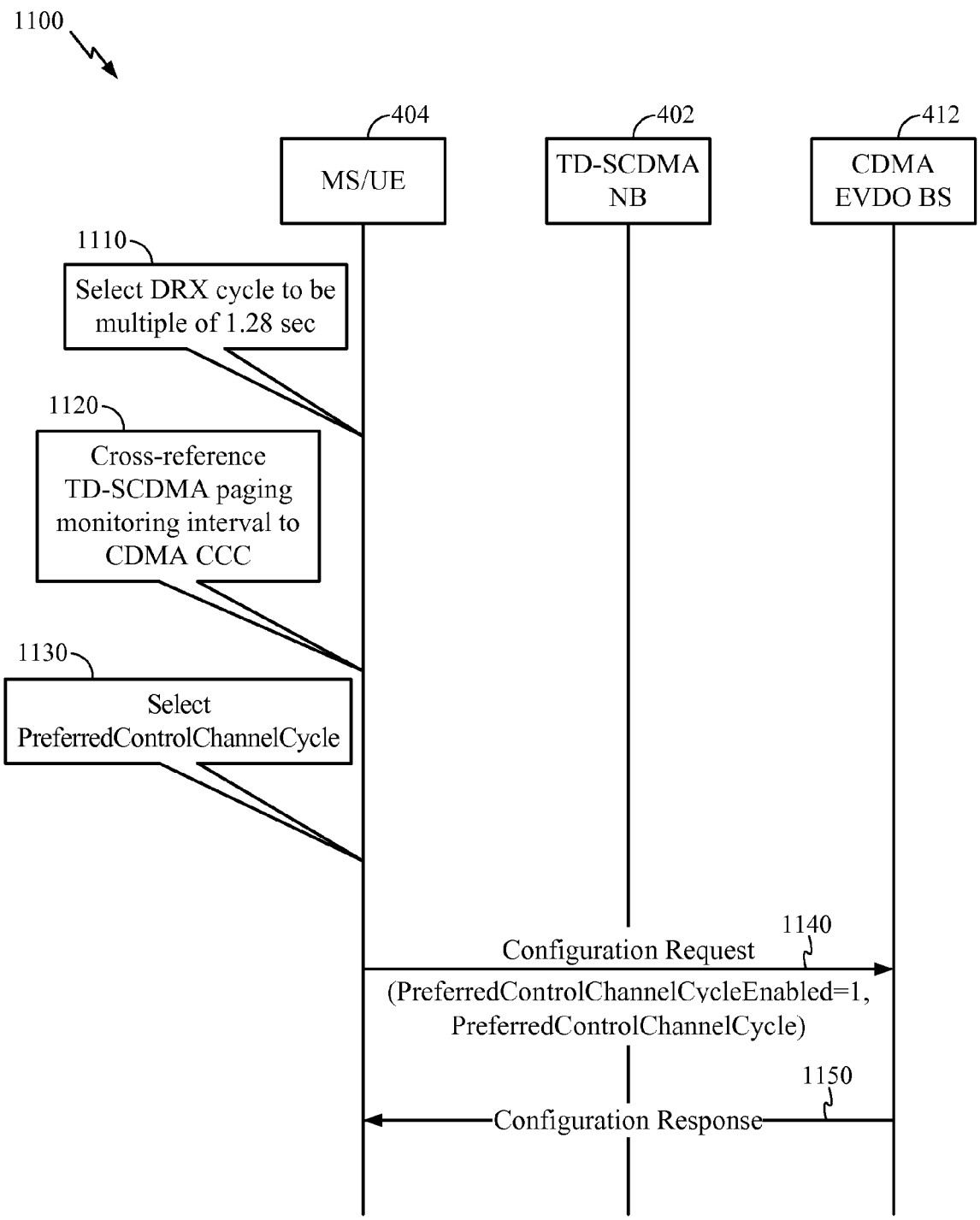
FIG. 11 illustrates an example call flow for avoiding conflicts between paging intervals of a CDMA EVDO network and of a TD-SCDMA network, in accordance with certain aspects of the present disclosure.

FIG. 11 illustrates an example call flow 1100 for avoiding conflicts between paging intervals of a CDMA EVDO network and of a TD-SCDMA network. At 1110, the MMT 404 (functioning as an MS in CDMA EVDO and as UE in TD-SCDMA) may select the DRX cycle to be a multiple of 1.28 seconds. The MMT may cross-reference the TD-SCDMA paging monitoring interval to the CDMA EVDO CCCs at 1120. At 1130, the MMT 404 may select the CCC index as the PreferredControlChannelCycle in an effort to avoid paging interval conflicts between the two networks. A Configuration Request message comprising the selected PreferredControlChannelCycle may be transmitted to the CDMA EVDO BS 412 at 1140. In the Configuration Request message, the PreferredControlChannelCycleEnabled bit may be set to 1. At 1150, the MMT 404 may receive a Configuration Response message transmitted from the EVDO BS 412 responding to the Configuration Request.

Aspects of the present disclosure may allow multimode terminals in idle mode to monitor paging messages reliably. This can achieve monitoring paging intervals free of conflicts in both TD-SCDMA and EVDO networks.

In one configuration, the apparatus 350 for wireless communication includes means for determining a DRX cycle length of a first network communicating via a first RAT, means for determining a paging cycle length of a second network communicating via a second RAT, means for detecting—based on the paging cycle length and the DRX cycle length—information associated with a position of a paging interval within the paging cycle length of the second network that avoids overlap between a paging interval of the first network and the paging interval of the second network, and means for communicating the information to the second network. In one aspect, the aforementioned means may be the processor(s) 370 and/or 390 configured to perform the functions recited by the aforementioned means. In another aspect, the aforementioned means may be a module or any apparatus configured to perform the functions recited by the aforementioned means.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for communicating, by a multi-mode terminal (MMT), with first and second networks via first and second radio access technologies (RATs), comprising:
    determining a discontinuous reception (DRX) cycle length of the first network that corresponds to start and an end of a paging interval of the first network;
    determining a paging cycle length of the second network;
    determining, based on the paging cycle length and the DRX cycle length, a set of channel control cycle (CCC) indices associated with a position of a paging interval within the paging cycle length of the second network that covers the paging interval of the first network, the set of channel control cycle indices determined to avoid overlap between the paging interval of the first network and the paging interval of the second network;
    communicating at least one of the channel control cycle indices in the set of channel control cycle indices to the second network; and
    scheduling the paging interval of the first network and the paging interval of the second network based on the determined information.

2. The method of claim 1, wherein the first RAT comprises Time Division Synchronous Code Division Multiple Access (TD-SCDMA).

3. The method of claim 2, wherein the second RAT comprises Code Division Multiple Access (CDMA) EVDO (Evolution-Data Optimized).

4. The method of claim 3, wherein the DRX cycle length is a multiple m of 1.28 seconds and the paging cycle length is a multiple n of 1.28 seconds.

5. The method of claim 1, wherein the start and the end of the paging interval of the first network are based on a delay for tuning a radio frequency (RF) circuit of the MMT.

6. The method of claim 1, wherein the DRX cycle length is a multiple m of 1.28 seconds, the paging cycle length is a multiple n of 1.28 seconds, and the start and the end of the paging interval of the first network are based on a greatest common denominator between m and n.

7. The method of claim 1, wherein communicating the at least one of the CCC indices to the second network comprises transmitting a Configuration Request with the at least one of the CCC indices as a Preferred Control Channel Cycle.

8. The method of claim 1, further comprising selecting one of the CCC indices, wherein communicating the at least one of the CCC indices comprises communicating the selected one of the CCC indices to the second network.

9. An apparatus for communicating with first and second networks via first and second radio access technologies (RATs), comprising:
    means for determining a discontinuous reception (DRX) cycle length of the first network that corresponds to start and an end of a paging interval of the first network;
    means for determining a paging cycle length of the second network;
    means for determining, based on the paging cycle length and the DRX cycle length, a set of channel control cycle (CCC) indices associated with a position of a paging interval within the paging cycle length of the second network that covers the paging interval of the first network, the set of channel control cycle indices determined to avoid overlap between the paging interval of the first network and the paging interval of the second network;
    means for communicating at least one of the channel control cycle indices in the set of channel control cycle indices to the second network; and
    means for scheduling the paging interval of the first network and the paging interval of the second network based on the determined information.

10. The apparatus of claim 9, wherein the first RAT comprises Time Division Synchronous Code Division Multiple Access (TD-SCDMA).

11. The apparatus of claim 10, wherein the second RAT comprises Code Division Multiple Access (CDMA) EVDO (Evolution-Data Optimized).

12. The apparatus of claim 11, wherein the DRX cycle length is a multiple m of 1.28 seconds and the paging cycle length is a multiple n of 1.28 seconds.

13. The apparatus of claim 9, wherein the start and the end of the paging interval of the first network are based on a delay for tuning a radio frequency (RF) circuit of the apparatus.

14. The apparatus of claim 9, wherein the DRX cycle length is a multiple m of 1.28 seconds, the paging cycle length is a multiple n of 1.28 seconds, and the start and the end of the paging interval of the first network are based on a greatest common denominator between m and n.

15. The apparatus of claim 9, wherein the means for communicating the at least one of the CCC indices to the second network comprises means for transmitting a Configuration Request with the at least one of the CCC indices as a Preferred Control Channel Cycle.

16. The apparatus of claim 9, further comprising means for selecting one of the CCC indices, wherein the means for communicating the at least one of the CCC indices comprises means for communicating the selected one of the CCC indices to the second network.

17. An apparatus for communicating with first and second networks via first and second radio access technologies (RATs), comprising:
at least one processor configured to:
determine a discontinuous reception (DRX) cycle length of the first network that corresponds to start and an end of a paging interval of the first network;
determine a paging cycle length of the second network;
determine, based on the paging cycle length and the DRX cycle length, a set of channel control cycle (CCC) indices associated with a position of a paging interval within the paging cycle length of the second network that covers the paging interval of the first network, the set of channel control cycle indices determined to avoid overlap between the paging interval of the first network and the paging interval of the second network;
communicate at least one of the channel control cycle indices in the set of channel control cycle indices to the second network; and
schedule the paging interval of the first network and the paging interval of the second network based on the determined information; and
a memory coupled to the at least one processor.

18. The apparatus of claim 17, wherein the first RAT comprises Time Division Synchronous Code Division Multiple Access (TD-SCDMA).

19. The apparatus of claim 18, wherein the second RAT comprises Code Division Multiple Access (CDMA) EVDO (Evolution-Data Optimized).

20. The apparatus of claim 19, wherein the DRX cycle length is a multiple m of 1.28 seconds and the paging cycle length is a multiple n of 1.28 seconds.

21. The apparatus of claim 17, wherein the start and the end of the paging interval of the first network are based on a delay for tuning a radio frequency (RF) circuit of the apparatus.

22. The apparatus of claim 17, wherein the DRX cycle length is a multiple m of 1.28 seconds, the paging cycle length is a multiple n of 1.28 seconds, and the start and the end of the paging interval of the first network are based on a greatest common denominator between m and n.

23. The apparatus of claim 17, wherein the at least one processor is configured to communicate the at least one of the CCC indices to the second network by transmitting a Configuration Request with the at least one of the CCC indices as a Preferred Control Channel Cycle.

24. The apparatus of claim 17, wherein the at least one processor is configured to select one of the CCC indices such that the at least one processor is configured to communicate the at least one of the CCC indices by communicating the selected one of the CCC indices to the second network.

25. A computer-program product for communicating with first and second networks via first and second radio access technologies (RATs), the computer-program product comprising:
a non-transitory computer-readable medium comprising code for:
determining a discontinuous reception (DRX) cycle length of the first network that corresponds to start and an end of a paging interval of the first network;
determining a paging cycle length of the second network;
determining, based on the paging cycle length and the DRX cycle length, a set of channel control cycle (CCC) indices associated with a position of a paging interval within the paging cycle length of the second network and cover the paging interval of the first network, the set of channel control cycle indices determined to avoid overlap between the paging interval of the first network and the paging interval of the second network;
communicating at least one of the channel control cycle indices in the set of channel control cycle indices to the second network; and
scheduling the paging interval of the first network and the paging interval of the second network based on the determined information.

26. The computer-program product of claim 25, wherein the first RAT comprises Time Division Synchronous Code Division Multiple Access (TD-SCDMA).

27. The computer-program product of claim 26, wherein the second RAT comprises Code Division Multiple Access (CDMA) EVDO (Evolution-Data Optimized).

28. The computer-program product of claim 27, wherein the DRX cycle length is a multiple m of 1.28 seconds and the paging cycle length is a multiple n of 1.28 seconds.

29. The computer-program product of claim 25, wherein the start and the end of the paging interval of the first network are based on a delay for tuning a radio frequency (RF) circuit of a multimode terminal (MMT) communicating with the first and second networks.

30. The computer-program product of claim 25, wherein the DRX cycle length is a multiple m of 1.28 seconds, the paging cycle length is a multiple n of 1.28 seconds, and the start and the end of the paging interval of the first network are based on a greatest common denominator between m and n.

31. The computer-program product of claim 25, wherein communicating the at least one of the CCC indices to the second network comprises transmitting a Configuration Request with the at least one of the CCC indices as a Preferred Control Channel Cycle.

32. The computer-program product of claim 25, wherein the computer-readable medium comprises code for selecting one of the CCC indices, wherein communicating the at least one of the CCC indices comprises communicating the selected one of the CCC indices to the second network.

* * * * *